United States Patent
Chang

(10) Patent No.: US 11,735,792 B2
(45) Date of Patent: Aug. 22, 2023

(54) BATTERY ASSEMBLY AND ELECTRONIC DEVICE HAVING THE SAME

(71) Applicant: Wistron Corp., New Taipei (TW)

(72) Inventor: Sung Ling Chang, New Taipei (TW)

(73) Assignee: WISTRON CORP., New Taipei (TW)

( * ) Notice: Subject to any disclaimer, the term of this patent is extended or adjusted under 35 U.S.C. 154(b) by 390 days.

(21) Appl. No.: 16/928,265

(22) Filed: Jul. 14, 2020

(65) Prior Publication Data

US 2021/0336238 A1 Oct. 28, 2021

(30) Foreign Application Priority Data

Apr. 24, 2020 (TW) .................. 109113852

(51) Int. Cl.
*H01M 50/20* (2021.01)

(52) U.S. Cl.
CPC ........ *H01M 50/20* (2021.01); *H01M 2220/30* (2013.01)

(58) Field of Classification Search
CPC .. H01M 50/20; H01M 50/244; H01M 50/262; H01M 50/296; H01M 50/247; H01M 2220/30; Y02E 60/10; H01R 4/48
See application file for complete search history.

(56) References Cited

U.S. PATENT DOCUMENTS

2004/0058231 A1* 3/2004 Takeshita ............ H01M 50/597
348/E5.025

FOREIGN PATENT DOCUMENTS

TW      M242884 U    9/2004
TW      201042426 A   12/2010

OTHER PUBLICATIONS

China Patent Office, "Office Action", dated Dec. 23, 2022, China.

\* cited by examiner

*Primary Examiner* — Kiran Quraishi Akhtar
(74) *Attorney, Agent, or Firm* — Locke Lord LLP; Tim Tingkang Xia, Esq.

(57) ABSTRACT

The disclosure relates to a battery assembly and an electronic device having the same, wherein the battery assembly is electrically connected to battery contact. The battery assembly includes a battery body, battery terminal, and first insertion portion. The battery terminal is disposed on the battery body, and the first insertion portion is slidably disposed on the battery body. The first insertion portion is removably inserted into an idle space formed in the battery contact so that at least part of the battery contact is clamped by the first insertion portion and the battery terminal.

27 Claims, 12 Drawing Sheets ial application claims priority under 35
BATTERY ASSEMBLY AND ELECTRONIC DEVICE HAVING THE SAME

CROSS-REFERENCE TO RELATED APPLICATIONS

This non-provisional application claims priority under 35 U.S.C. § 119(a) on Patent Application No(s). 109113852 filed in Taiwan on Apr. 24, 2020, the entire contents of which are hereby incorporated by reference.

TECHNICAL FIELD

The disclosure relates to an energy storage component, more particularly to a battery assembly having a fixing arrangement for maintaining electrical contact and an electronic device having the same.

BACKGROUND

With the advancement of technology, in order to meet various needs, more and more functions can be integrated into one portable electronic device, such as smartphones used in daily life, industrial mobile phones, or scanners. In addition, considering power consumption, ease of use, and other factors, portable electronic devices are usually equipped with energy storage component (e.g., rechargeable battery) to achieve a continuous use of the device.

Generally, the battery is electrically connecting to the battery contact on the device by battery terminal so as to provide electricity to the device. In detail, in standard specifications, the battery contact is in the form of one or more metal elastic sheet pieces, the metal sheet can be deformed when being pushed by the terminal, leading to a tight contact between the metal sheet and the terminal to maintain electrical connection. In most cases, the metal sheet will not be deformed to its maximum limitation by the terminal so as to ensure the reusability of the metal sheet, that is to say, when the battery is installed in position, the metal sheet still has room for further deformation even when it is pressed against the terminal. However, such an arrangement will cause problems in some situations.

Specifically, the external force caused by the shaking of the device or by the device falling on the ground is highly possible to deform the metal sheet furtherly, which will cause separation of the metal sheet from the terminal and thus resulting in poor contact or power off. As a result, it may cause inconvenience in use, such as interruption during data transmission. Once the elastic fatigue of the metal sheet makes the metal sheet unable to maintain the contact force with the battery as before, the metal sheet will be more easily deformed by the external force and then occur power off issues.

SUMMARY

One embodiment of the disclosure provides an electronic device including a device body and a battery assembly. The device body includes a plate component, a protrusion, and at least one battery contact. The protrusion is disposed on the plate component. The at least one battery contact protrudes outwardly from the protrusion. The at least one battery contact and the protrusion form an idle space therebetween. The battery assembly includes a battery body, at least one battery terminal, and at least one first insertion portion. The at least one battery terminal is disposed on the battery body. The at least one first insertion portion is slidably disposed on the battery body. The battery body is detachably installed on the plate component of the device body, the at least one battery terminal is configured to be electrically connected to the at least one battery contact, the at least one first insertion portion is configured to be removably inserted into the idle space so that at least part of the at least one battery contact is clamped by the at least one first insertion portion and the at least one battery terminal.

Another embodiment of the disclosure provides a battery assembly detachably installed on a device body and electrically connected to at least one battery contact on a protrusion of the device body. The battery assembly includes a battery body, at least one battery terminal, at least one first insertion portion. The at least one battery terminal is disposed on the battery body, and the at least one first insertion portion is slidably disposed on the battery body. The at least one first insertion portion is removably inserted into an idle space formed between the at least one battery contact and the protrusion so that at least part of the at least one battery contact is clamped by the at least one first insertion portion and the at least one battery terminal.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Figure 1:
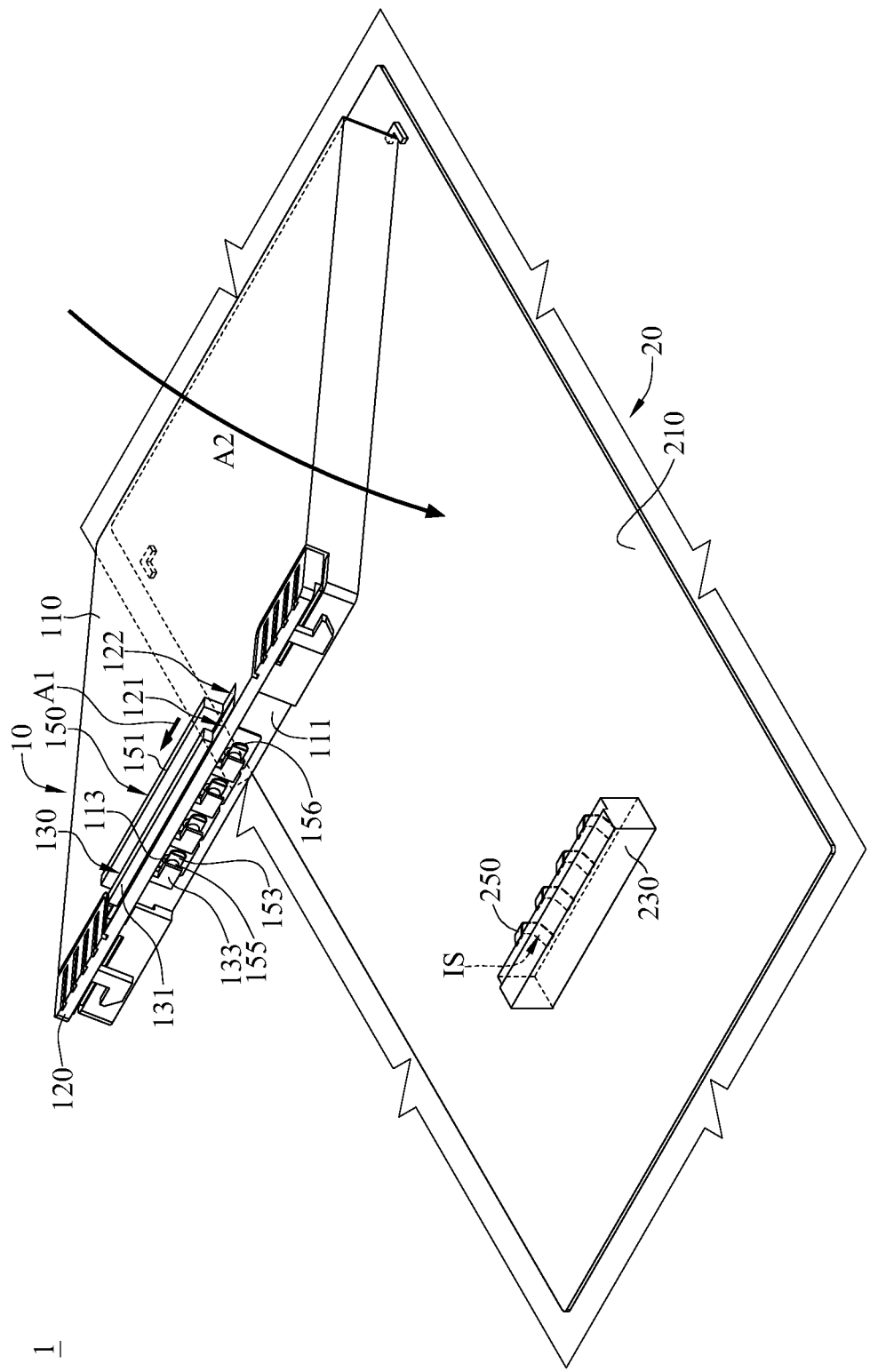
FIG. 1 is a perspective exploded view of an electronic device according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details.

In addition, for the purpose of simple illustration, well-known features may be drawn schematically, and some unnecessary details may be omitted from the drawings. And the size or ratio of the features in the drawings of the present disclosure may be exaggerated for illustrative purposes, but the present disclosure is not limited thereto. Note that the actual size and designs of the product manufactured based on the teaching of the present disclosure may also be properly modified according to any actual requirement.

Further, as used herein, the terms "end", "part", "portion" or "area" may be used to describe a technical feature on or between component(s), but the technical feature is not limited by these terms. In addition, unless otherwise specified, the term "substantially", "approximately" or "about"

may be used herein to provide an industry-accepted tolerance to its corresponding term without resulting in a change in the basic function of the subject matter at issue.

Furthermore, unless otherwise defined, all the terms used in the disclosure, including technical and scientific terms, have their ordinary meanings that can be understood by those skilled in the art. Moreover, the definitions of the above terms are to be interpreted as being consistent with the technical fields related to the disclosure. Unless specifically defined, these terms are not to be construed as too idealistic or formal meanings.

Firstly, referring to FIG. 1, one embodiment of the disclosure provides an electronic device 1. The electronic device 1 is, but not limited to, a portable electronic device having, such as a smartphone, industrial phone or scanner. The electronic device 1 may include a battery assembly 10 and a device body 20. The battery assembly 10 is detachably installed on the device body 20. The battery assembly 10 may include one or more rechargeable batteries (not numbered) that are able to store electrical energy for the device body 20.

Note that this and other embodiments are mainly focusing on the electrical contact between the battery assembly 10 and the device body 20 and the fixing mechanism for securing the electrical contact. Thus, the functions, types, size, and specifications of the electronic device 1 may be modified according to actual requirements and do not intend to limit the disclosure. And FIG. 1 and other subsequent figures may only show the parts of the device body 20 that relate to the installation of the battery assembly 10 while omitting some unnecessary electronic or non-electronic components, such as traces and screws.

Figure 2:
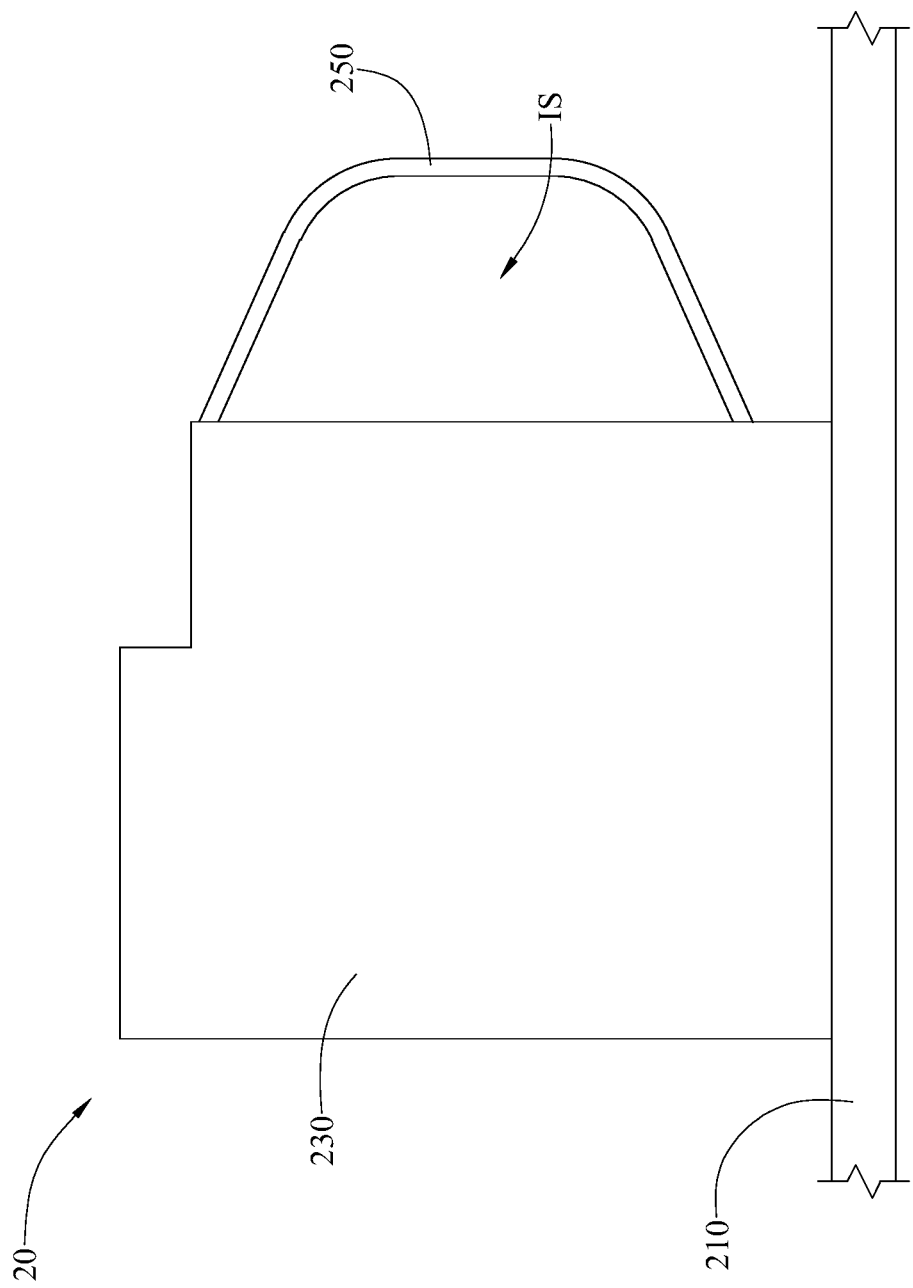
FIG. 2 is a partial enlarged side view of a device body in FIG. 1.
Figure 3A:
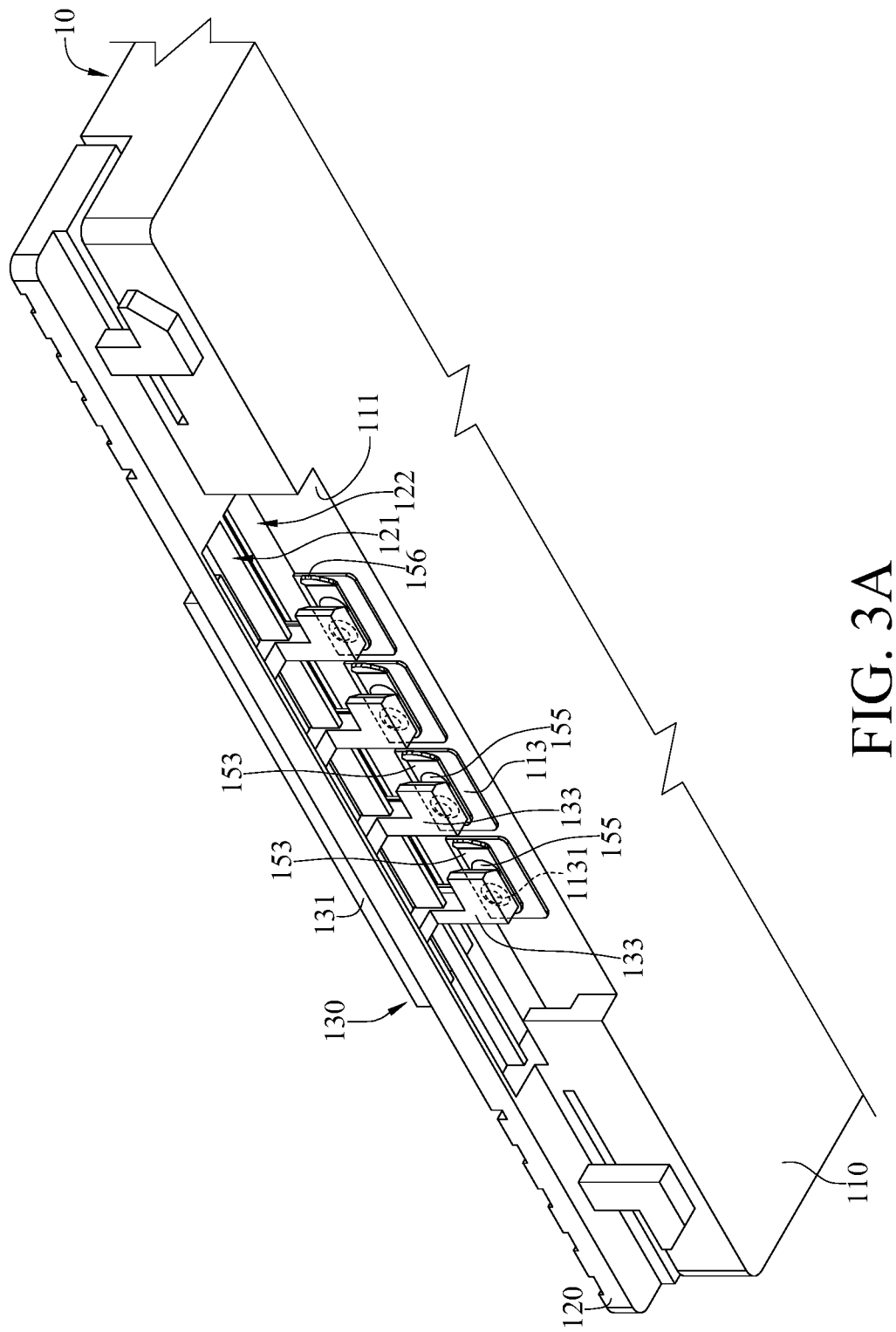
FIG. 3A is a perspective view of a battery assembly in FIG. 1.
Figure 3B:
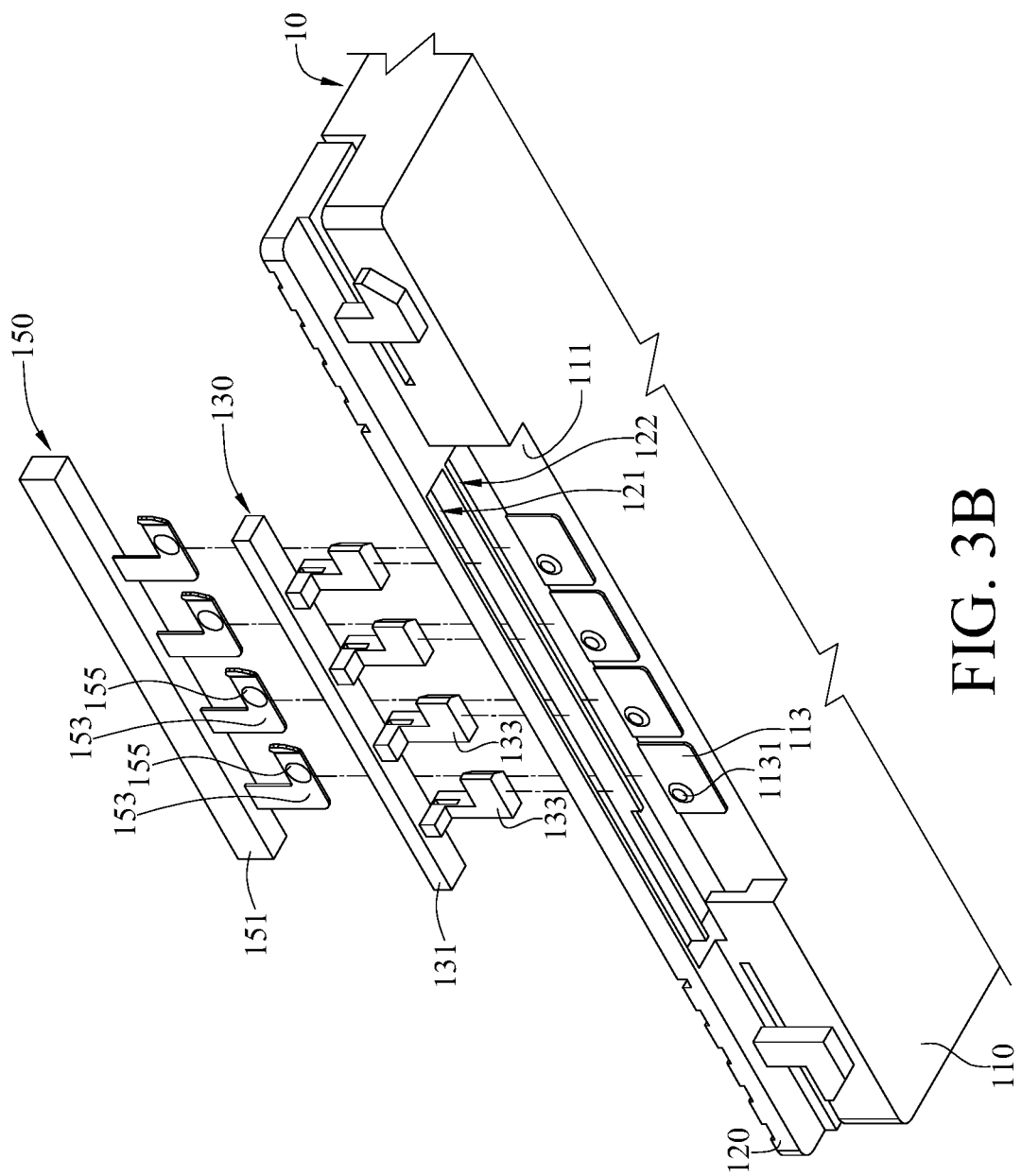
FIG. 3B is an exploded view of the battery assembly in FIG. 3A.

Then, please refer to FIG. 1 and further refer to FIGS. 2-3B, in this embodiment, the device body 20 may include a plate component 210, a protrusion 230, and at least one battery contact 250. The plate component 210 is, but not limited to, a circuit board that can be electrically connected to other electrical or electronic components in the device body 20, or an assembly having a circuit board and one or more layer of casing structures, but the disclosure is not limited thereto. The protrusion 230 is disposed on and protrudes outwardly from the surface of the plate component 210. In this embodiment, the protrusion 230 is directly disposed on the plate component 210, but the disclosure is not limited thereto; for example, in other embodiments, the protrusion 230 and the plate component 210 may be spaced apart by one or more layer of casing structures.

The battery contacts 250 are disposed on a side of the protrusion 230 and are electrically connected to other electrical and electronic components in the device body 20 via internal traces (not shown). As shown, each of the battery contacts 250 at least includes a curved and elastic sheet protruding outwardly from the surface of the protrusion 230 and forming an idle space IS with the surface of the protrusion 230. In this and some other embodiments, the battery contacts 250 may be made of, but not limited to, a suitable metal material that is conductive and has a certain degree of elasticity, such that the battery contacts 250 can be used to be electrically connected to the battery assembly 10 and produce a recoverable deformation when being pressed by the battery assembly 10. Thus, the battery contacts 250 may also be called as "battery spring connectors" or simply called as "elastic metal plate". It is understood that the deformation of the battery contact 250 also changes the shape and size of the idle space IS. In addition, the shape and size of the battery contact 250 may be modified according to actual requirements, the quantity of the battery contacts 250 may also be increased or decreased according to actual requirements, and the disclosure is not limited thereto.

In this embodiment, the battery assembly 10 may include a battery body 110, a first slidable component 130, and a second slidable component 150. The battery body 110 is detachably installed on or above the plate component 210 of the device body 20 and can be arranged adjacent to a side of the protrusion 230 having the battery contacts 250. The battery body 110 may be the part of the battery assembly 10 that is mainly used for accommodating rechargeable batteries or for storing electrical energy. Note that the shape, size, and charge capacity of the battery body 110 and the quantity of the rechargeable batteries contained in the battery body 110 are not particularly restricted and the disclosure is not limited thereby. In more detail, in this or some other embodiments, the battery body 110 may include an eaves portion 120, a contact side 111, and at least one battery terminal 113; the contact side 111 is a side of the battery body 110 that will be in contact or be oriented towards the battery contact 250 when the battery body 110 is placed on the device body 20 in position; the battery terminals 113 are disposed on the contact side 111, and the battery terminals 113 may be made of any suitable conductive metal and are configured to be respectively electrically connected to and provide electrical energy to the battery contacts 250 of the device body 20. It is understood that the battery terminals 113 of the battery assembly 10 and the battery contacts 250 of the device body 20 have the same quantity and can be arranged to be aligned with each other, but the disclosure is not limited thereto. In addition, in this or some other embodiments, the battery terminals 113 may each have a contact bump 1131, and its purpose will be detailed in later paragraphs.

The eaves portion 120 protrudes outwardly from the contact side 111 of the battery body 110. In this and some other embodiments, the battery body 110 may have a first groove 121 and a second groove 122, and the first groove 121 and the second groove 122 are located on the eaves portion 120. As shown, the first groove 121 and the second groove 122 are two long holes spaced apart from each other and are parallel to each other, wherein the second groove 122 is located closer to the contact side 111 of the battery body 110 or the battery terminals 113 on the contact side 111 than the first groove 121, and the first groove 121 and the second groove 122 substantially extend along a direction parallel to an arrangement direction of the battery terminals 113; in other words, the extension direction of the first groove 121 and the second groove 122 is substantially parallel to the arrangement direction of the battery terminals 113.

The first slidable component 130 is slidably disposed at the first groove 121 of the eaves portion 120. Specifically, in this embodiment, the first slidable component 130 may include a first mount portion 131 and at least one first insertion portion 133, wherein the first mount portion 131 is an elongated block and is slidably disposed in the first groove 121 of the eaves portion 120, the first insertion portions 133 protrude from a side of the first mount portion 131 and extend in a direction away from the eaves portion 120, and the first insertion portions 133 are spaced apart from each other and arranged along the first mount portion 131, such that the first insertion portions 133 can be moved along with the first mount portion 131 along the first groove 121 of the eaves portion 120. As such, the first insertion portions 133 are slidably disposed on the battery body 110 and therefore have a first holding position (as shown in FIG. 4C discussed in later paragraphs) and a first released position (as shown in FIG. 1). It is understood that the slidable direction of the first insertion portions 133 is substantially parallel to the arrangement direction of the battery terminals 113. As shown, each of the first insertion portion 133 may be in L shape, but the disclosure is not limited thereto.

In this embodiment, the first mount portion 131 and the first insertion portions 133 are, but not limited to, an integrally-formed plastic made object, but the disclosure is not limited thereto. In addition, in this and some other embodiments, the quantity of the first insertion portions 133 of the first slidable component 130 is the same as that of the battery terminals 113 of the battery body 110, each of the first insertion portions 133 is sized and shaped to allow itself to be able to slide into the idle space IS between the battery contact 250 and the protrusion 230 while in the first holding position so that the first insertion portions 133 can be used as a fixing arrangement to secure or improve the electrical contact between the battery terminals 113 and the battery contacts 250, and which will be detailed in later paragraphs.

The second slidable component 150 is slidably disposed at the second groove 122 of the eaves portion 120. Specifically, in this embodiment, the second slidable component 150 may include a second mount portion 151 and at least one second insertion portion 153, wherein the second mount portion 151 is an elongated block and is slidably disposed in the second groove 122 of the eaves portion 120, the second insertion portions 153 protrude from a side of the second mount portion 151 and extend in a direction away from the eaves portion 120, and the second insertion portions 153 are spaced apart from each other and arranged along the second mount portion 151, such that the second insertion portions 153 can be moved along with the second mount portion 151 along the second groove 122 of the eaves portion 120. As such, the second insertion portions 153 are slidably disposed on the battery body 110 and therefore have a second holding position (as shown in FIG. 4B discussed in later paragraphs) and a second released position (as shown in FIG. 1). It is understood that the slidable direction of the second insertion portions 153 is substantially parallel the arrangement direction of the battery terminals 113. In such an arrangement, the second insertion portions 153 of the second slidable component 150 are slidably located between the first insertion portions 133 of the first slidable component 130 and the battery terminals 113. In addition, as shown, each of the second insertion portions 153 may be in L shape, but the disclosure is not limited thereto.

In this embodiment, at least the second insertion portions 153 of the second slidable component 150 may be made of any suitable metal material that is conductive and has elasticity. Compared to the first insertion portions 133 made of plastic, the second insertion portion 153 may have better flexibility; in other words, compared to the second insertion portions 153, the first insertion portions 133 may have better flexing resistance or stiffness. And the second mount portion 151 is, but not limited to, also made of plastic. In addition, in this and some other embodiments, the quantity of the second insertion portions 153 of the second slidable component 150 is the same as that of the battery terminals 113 of the battery body 110, each of the second insertion portions 153 is sized and shaped to allow its distal end to be able to slide into the idle space IS between the battery contact 250 and the protrusion 230 while in the second holding position so that the second insertion portions 153 can be used as a fixing arrangement to secure or improve the electric contact between the battery terminals 113 and the battery contacts 250, and which will be detailed in later paragraphs.

In addition, in this or some other embodiments, the second slidable component 150 may further include at least one convex structure 155 respectively protrude from surfaces of the second insertion portions 153 facing towards the first insertion portions 133 of the first slidable component 130; in other words, the convex structures 155 respectively protrude from surfaces of the second insertion portions 153 opposite to the battery terminals 113.

In addition, in this or some other embodiments, the second insertion portions 153 of the second slidable component 15 may each have a bent portion 156 extending in a direction away from the battery terminals 113 from a distal end (or free end) of the second insertion portion 153.

Figure 4A:
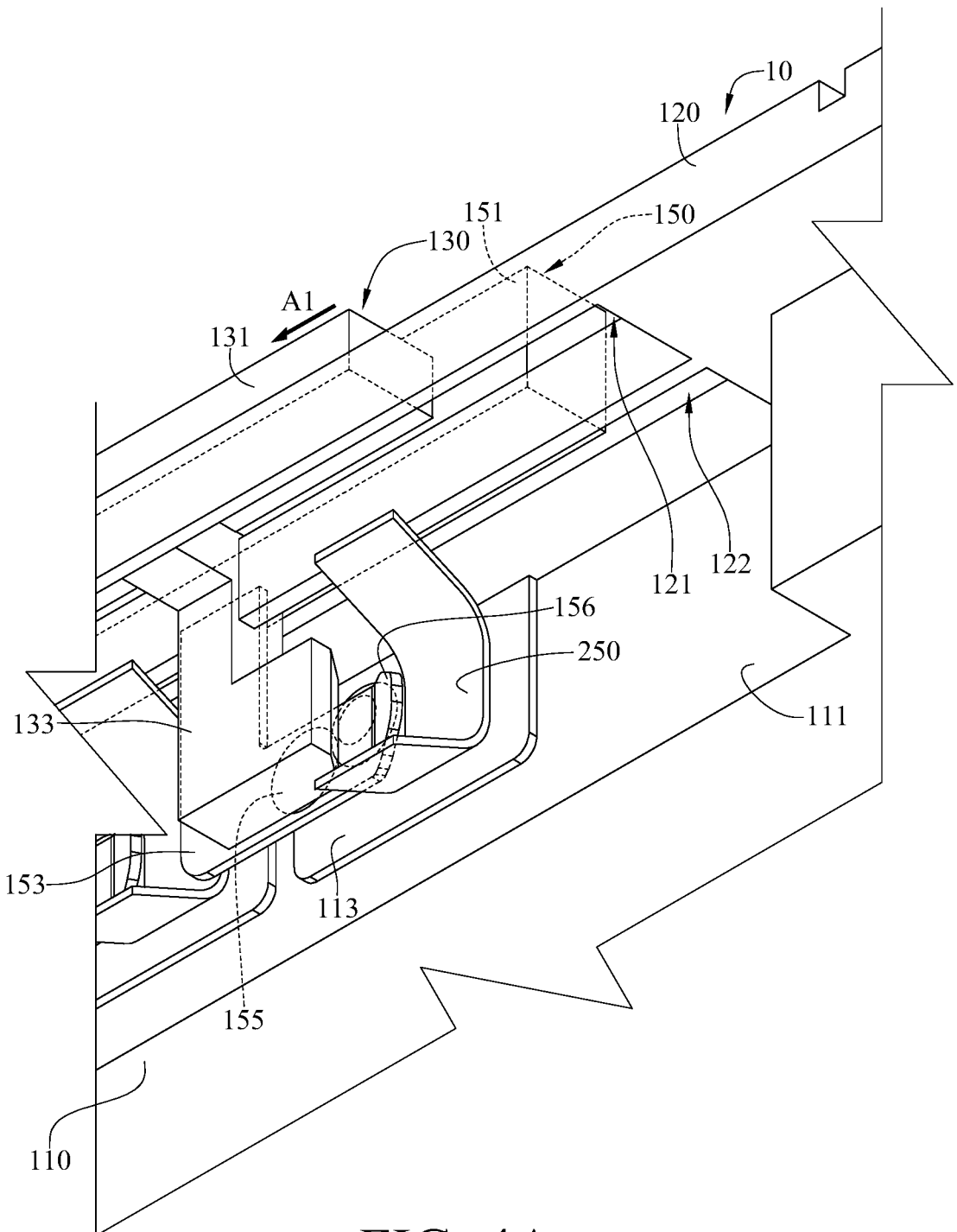
FIGS. 4A-4C show the installation processes of the battery assembly in FIG. 1.
Figure 4B:
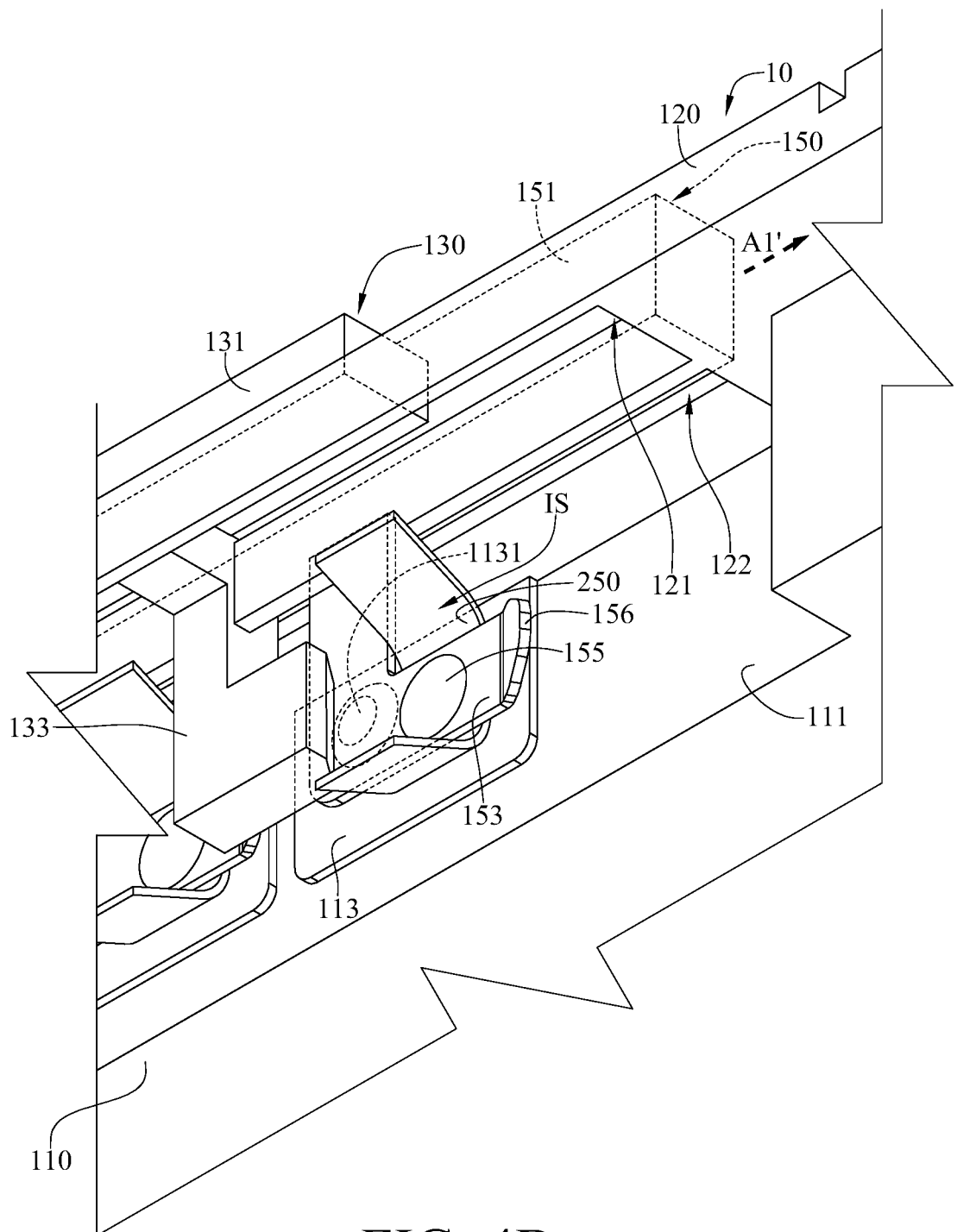
Figure 4C:
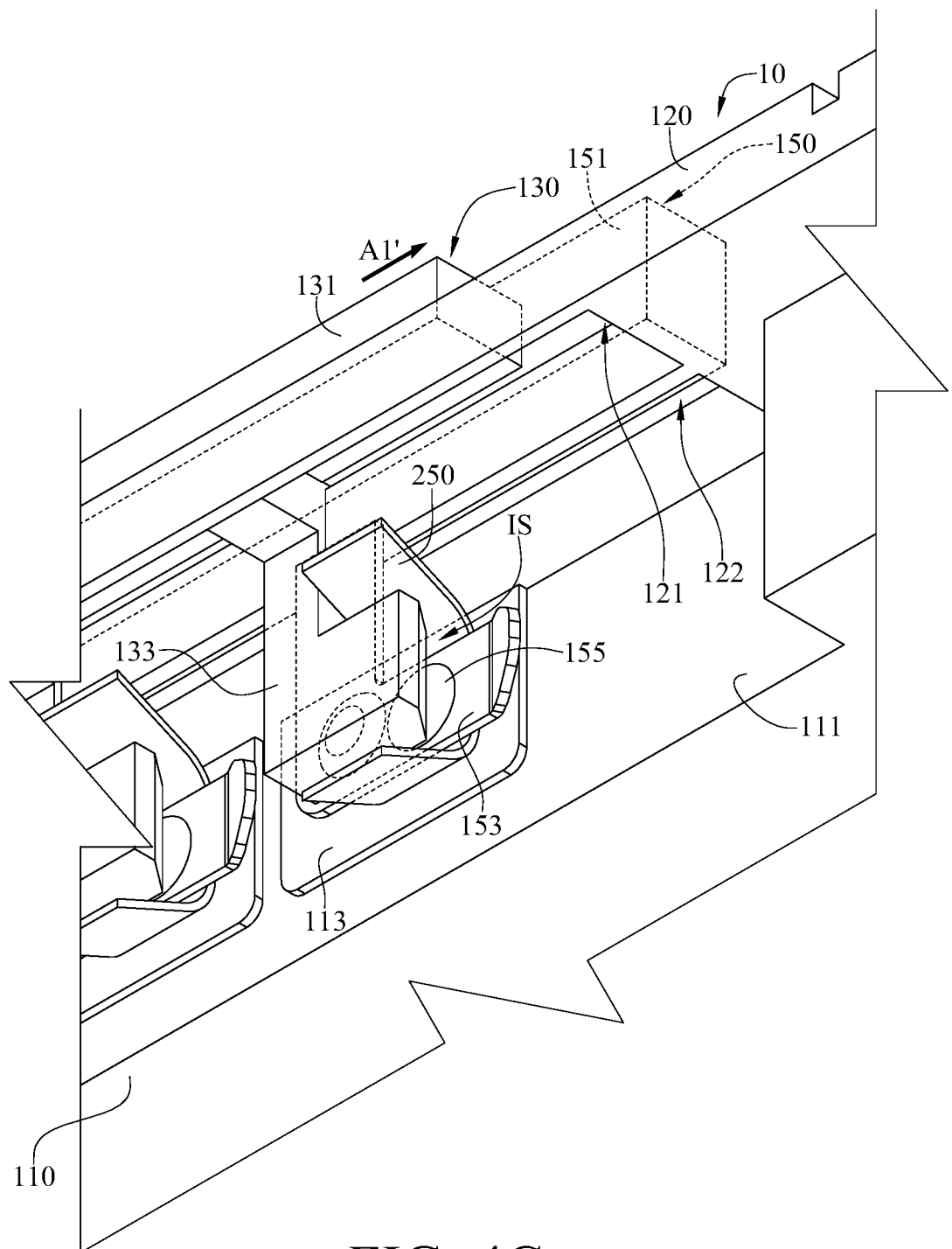

Then, referring to FIG. 1 and further referring to FIGS. 4A-4C, there are shown the installation processes of the battery assembly 10. Note that, for the purpose of simple illustration and easy understanding, FIGS. 4A-4C may mainly focus on the interaction between one of the battery terminals 113 and the respective battery contact 250, such that only part of the electronic device 1 will be shown.

Firstly, before placing the battery assembly 10 onto the device body 20, the first slidable component 130 and the second slidable component 150 may be moved as indicated by arrow A1 shown in FIG. 1. By doing so, the first insertion portion 133 of the first slidable component 130 can be pushed to the first released position, and the second insertion portion 153 of the second slidable component 150 can be pushed to the second released position. Then, the battery assembly 10 can be placed onto the plate component 210 of the device body 20 (as indicated by arrow A2). As shown in FIG. 4A, the first insertion portion 133 and the second insertion portion 153 at this moment may cover part of the corresponding battery terminal 113, and another part of the battery terminal 113 is directly exposed to the corresponding battery contact 250.

At this moment, the battery terminal 113 of the battery assembly 10 may be in direct contact with the battery contact 250 of the device body 20 so as to provide electricity to the device body 20 or may be not yet in contact with the battery contact 250 yet.

In addition, as shown in FIG. 1, in this or some other embodiments, there may be one or more stopping structures (not numbered) disposed on the device body 20 and located close to a side of the battery body 110 of the battery assembly 10 opposite to the contact side 111, and the stopping structures are configured to hold the battery assembly 10 in position so as to prevent the battery assembly 10 from moving away from the battery contacts 250. The disclosure is not limited to the stopping structures illustrated in the drawings. Any suitable means that can be arranged at sides of the battery assembly 10 opposite to the battery contacts 250 to hold or position the battery assembly 10 can be served as or replace the aforementioned stopping structures.

Then, the second slidable component 150 is pushed in a direction opposite to arrow A1, specifically, as shown in FIG. 4B, the second mount portion 151 of the second slidable component 150 is pushed along the direction indicated by arrow A1' so as to move the second insertion portion 153 towards the second holding position and insert the second insertion portion 153 into the idle spaces IS of the battery contact 250. During this movement of the second insertion portion 153, the bent portion 156 at the distal end (or free end) of the second insertion portion 153 can guide the second insertion portion 153 to enter the idle space IS. And during the movement of the second insertion portion 153 into the idle space IS, part of the battery contact 250 will be located between the second insertion portion 153 and the battery terminal 113 so as to slightly deform the second insertion portion 153. In other words, part of the battery contact 250 will be clamped by the second insertion portion 153 and the battery terminal 113. In such a case, the elastic potential energy stored in the second insertion portion 153 helps improve and maintain the contact force between the battery terminal 113 and the battery contact 250.

Meanwhile, the part of the second insertion portion 153 not yet inserted into the idle space IS is electrically connected to the contact bump 1131 of the battery terminal 113. In such a case, in addition to the direct contact between the battery terminal 113 and the battery contact 250, the contact between the contact bump 1131 and the second insertion portion 153 is another approach for the battery terminal 113 to be electrically connected to the battery contact 250, such that there are more than one conductive paths between the battery terminal 113 and the battery contact 250. Thus, if the battery contact 250 accidentally leaves the battery terminal 113, the electrical contact between the second insertion portion 153 and the contact bump 1131 still can secure the electrical connection between the battery contact 250 and the battery terminal 113. This improves the reliability of the electrical connection and prevents the device from being powered off.

Then, the first slidable component 130 is pushed in a direction opposite to arrow A1, specifically, as shown in FIG. 4C, the first mount portion 131 of the first slidable component 130 is pushed along the direction indicated by arrow A1' so as to move the first insertion portion 133 towards the first holding position and insert the first insertion portion 133 into the idle space IS of the battery contact 250. During this movement of the first insertion portion 133 into the idle space IS, the first insertion portion 133 will enter into between the second insertion portion 153 and the protrusion 230 so as to press against the convex structure 155 of the second insertion portion 153, such that the first insertion portion 133 can apply force to the part of the second insertion portion 153 located in the idle space IS so as to force it towards the battery terminal 113. This can further increase the contact force between the battery terminal 113 and the battery contact 250. As shown, part of the battery contact 250 is clamped by the first insertion portion 133 and the battery terminal 113, and the part of the second insertion portion 153 in the idle space IS is forced by the first insertion portion 133 and clamped by the first insertion portion 133 and the battery contact 250.

At this moment, the convex structure 155 can maintain the first slidable component 130 and the second slidable component 150 in point contact, which facilitates the sliding movement of the first insertion portion 133 relative to the second insertion portion 153. Also, as discussed, the first insertion portion 133 has a higher stiffness than the second insertion portion 153, thus the insertion of the first insertion portion 133 helps increase the overall stiffness of the first insertion portion 133, the second insertion portion 153, and the battery contact 250 and make the battery contact 250 less likely to be deformed by external force.

Through the foregoing steps, the first insertion portion 133 of the first slidable component 130 and the second insertion portion 153 of the second slidable component 150 can hold and pressure the battery contact 250 of the device body 20 so as to improve and secure the electrical contact between the battery contact 250 and the battery terminal 113, thus the battery contact 250 is prevented from being further deformed due to sudden impact. As such, the battery contact 250 is prevented from being separated from the battery terminal 113 due to external force occurring during the shaking of the electronic device 1 or the electronic device 1 falling on the ground, or due to elastic fatigue of the battery contact 250, thereby preventing poor contact or power off of the electronic device 1 and thus improving the reliability.

The above embodiment is exemplary, any suitable design that can maintain the electrical connection between the battery contact 250 and the battery terminal 113 while avoiding the deformation of the battery contact 250 due to external force shall fall within the scope of the disclosure. For example, in some embodiments, the second slidable component of the battery assembly may only include the second insertion portions, and the second insertion portions may be directly disposed on the first insertion portions so that the second insertion portions are able to be moved with the first insertion portions; in such a case, the insertion of the first insertion portions and second insertion portions into the idle space of the battery contact also can achieve the effect of preventing the battery contacts from being affected by external force and leaving the battery terminals, and the part of the second insertion portions not inserted into the idle space still can have electrical contact with the contact bumps of the battery terminals to achieve the effect of increasing the number of conductive path between the battery terminals and the battery contacts.

In some other embodiments, the first insertion portion may be shaped to have a structural strength sufficient to prevent further deformation of the battery contact due to external force; in such a case, the battery assembly may omit the second slidable component.

Figure 5:
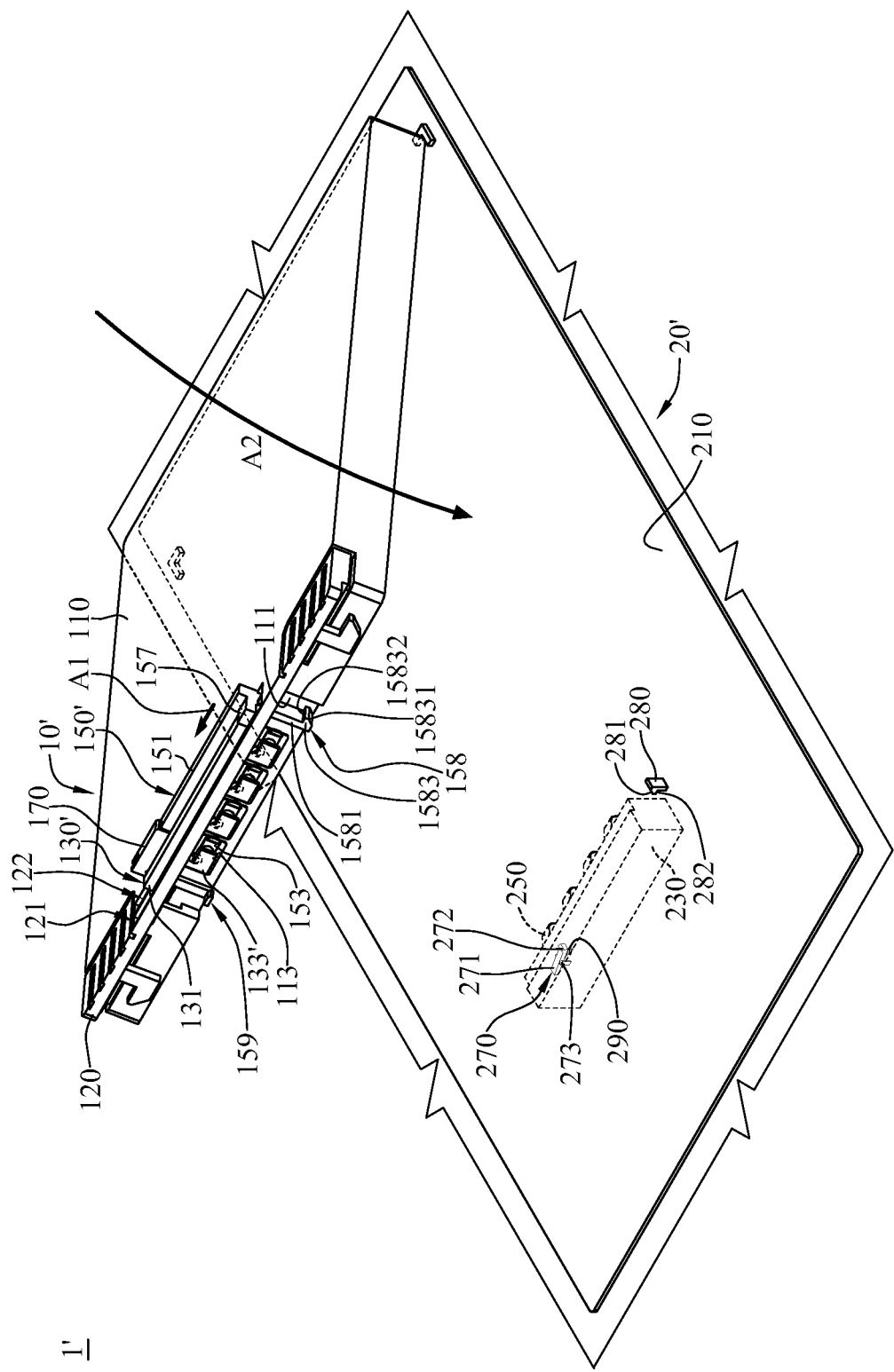
FIG. 5 is a perspective exploded view of an electronic device according to another embodiment of the disclosure.

Then, please refer to FIG. 5, an electronic device 1' of another embodiment of the disclosure is provided. Note that, for the purpose of simple descriptions and easy understanding, only the differences between this and the previous embodiments will be described in the following paragraphs, the similar or same parts of them can be referred to the preceding descriptions and will not be repeated hereinafter, and the similar or same components will be numbered the similar or same reference numbers.

As shown, in this embodiment, a battery assembly 10' of the electronic device 1' may include a first slidable component 130', a second slidable component 150', a latch 170, a first restoring component 181, and a second restoring component 182, and a device body 20' of the electronic device 1' may include a stopper 270, a hooking structure 280, and a third restoring component 290.

Specifically, one of the first insertion portion 133' of the first slidable component 130' has a recess 1331 located on an edge of the first insertion portion 133' away from the first mount portion 131. The first restoring component 181 is, for example, a compression spring, having one end fixed to the battery body 110 of the battery assembly 10' and another end pressed by or fixed to the first mount portion 131 or the first insertion portion 133', that is, the first restoring component 181 is clamped by the battery body 110 and the first insertion portion 133'. The first restoring component 181 can constantly apply force to the first insertion portions 133' so as to force them to move towards the first holding position (as shown in FIG. 5).

In addition, in this embodiment, the second slidable component 150' may include a push part 157, an engaging part 158, and a lifting part 159. The push part 157 may be a block protruding from the second mount portion 151 and located at an end of the first mount portion 131. The push part 157 is configured to push the first mount portion 131 of the first slidable component 130' during the movement of the second insertion portion 153 moving towards the second released position so as to force the first insertion portion 133' to move towards the first released position. As shown, the push part 157 of the second slidable component 150' is slidable located above the first groove 121 of the eaves portion 120.

The engaging part 158 and the lifting part 159 of the second slidable component 150' are respectively located at two opposite ends of the second mount portion 151 and both are extending outwardly from the second mount portion 151 and disposed through the second groove 122 of the eaves portion 120. In detail, the engaging part 158 may include an extension portion 1581 and a hooking portion 1583, the extension portion 1581 is connected to the second mount portion 151 and is slidably disposed through the second groove 122, and the hooking portion 1583 is connected to the second mount portion 151 via the extension portion 1581. Further, the hooking portion 1583 may have a contact surface 15831 and a first flat stopping surface 15832, the contact surface 15831 may be substantially facing away from the second mount portion 151, and the first flat stopping surface 15832 is located opposite to the contact surface 15831 and will be substantially facing away from the plate component 210 as the battery assembly 10' is placed on the device body 20'.

The lifting part 159 may include an extension portion 1591 and a push portion 1593, the extension portion 1591 is connected to the second mount portion 151 and is slidably disposed through the second groove 122 of the eaves portion 120, and the push portion 1593 is connected to the second mount portion 151 via the extension portion 1591. Further, the push portion 1593 may have a pushing surface 15931 (as shown in FIG. 6C discussed in later paragraphs), the pushing surface 15931 may be inclined with respect to the plate component 210 and substantially facing away from the plate component 210 as the battery assembly 10' is placed on the device body 20'.

In this embodiment, the second restoring component 182 is, for example, a compression spring, having one end fixed to the battery body 110 of the battery assembly 10' and another end pressed by or fixed to the second mount portion 151, second insertion portion 153, or lifting part 159 of the second slidable component 150', that is, the second restoring component 182 is clamped by the battery body 110 and the second insertion portion 153. The second restoring component 182 can constantly apply force to the second insertion portions 153 so as to force them to move towards the second holding position (as shown in FIG. 5).

Figure 6A:
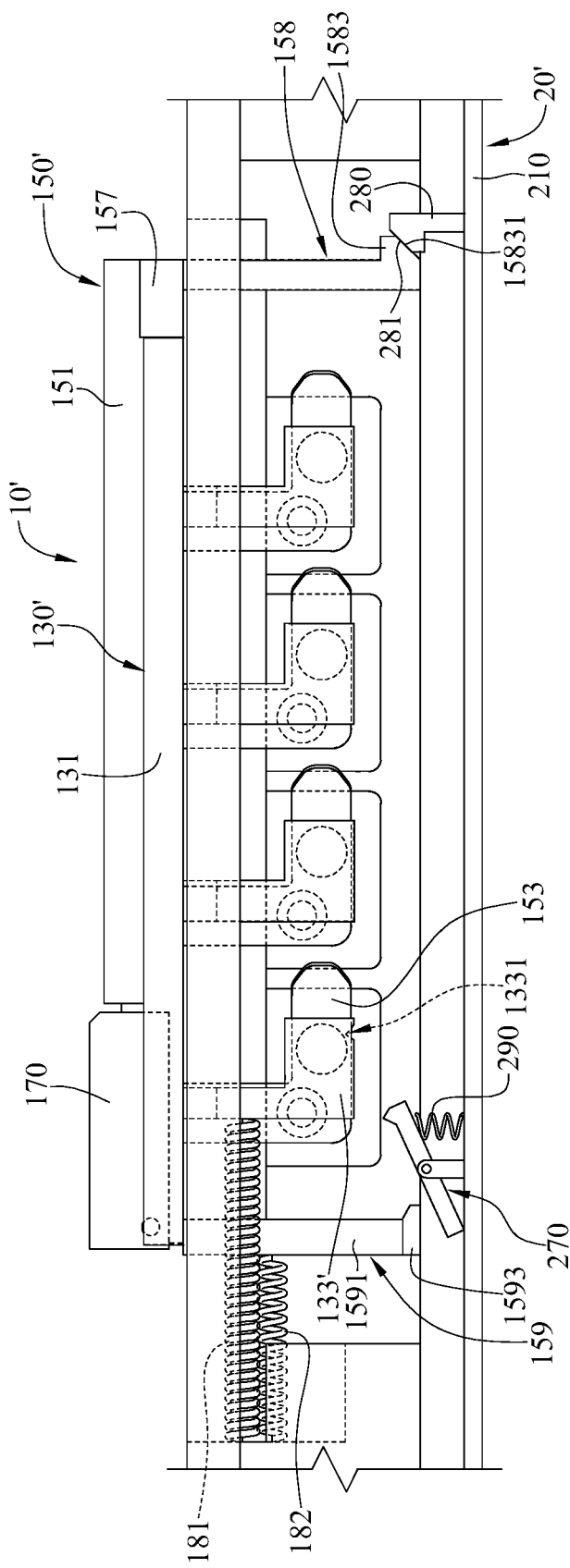
FIGS. 6A-6D show the installation processes of the battery assembly in FIG. 5.
Figure 6B:
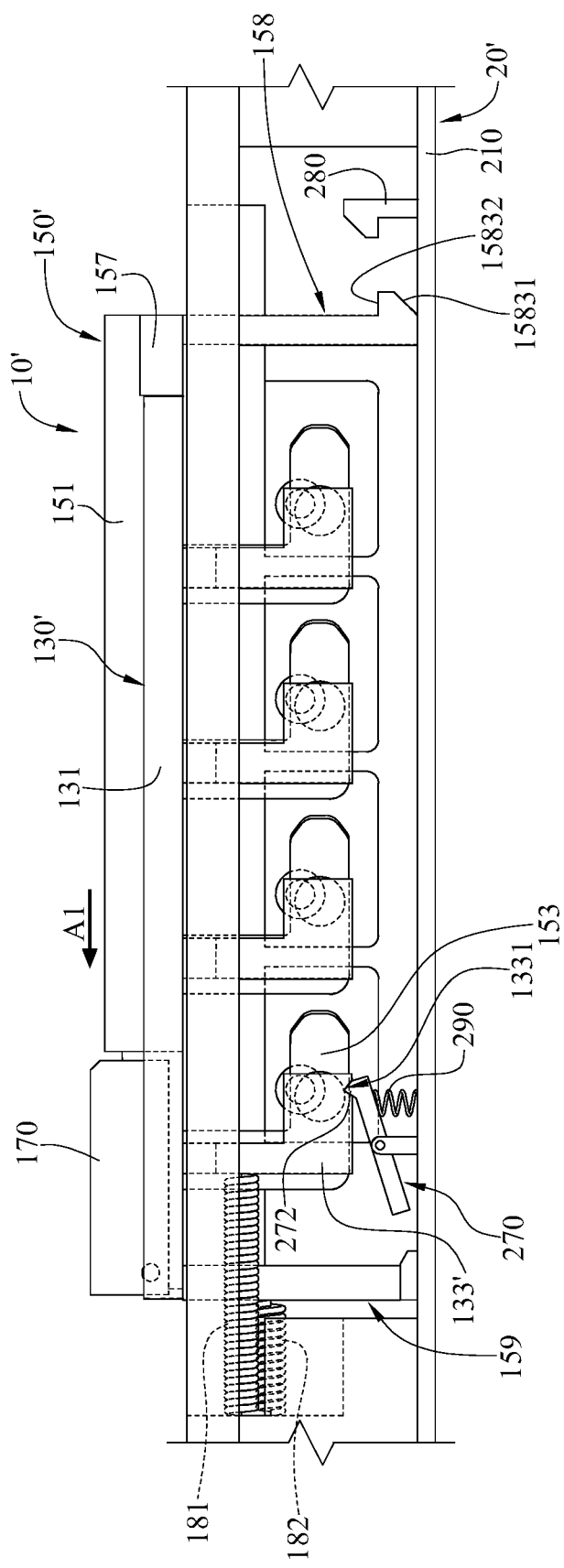
Figure 6C:
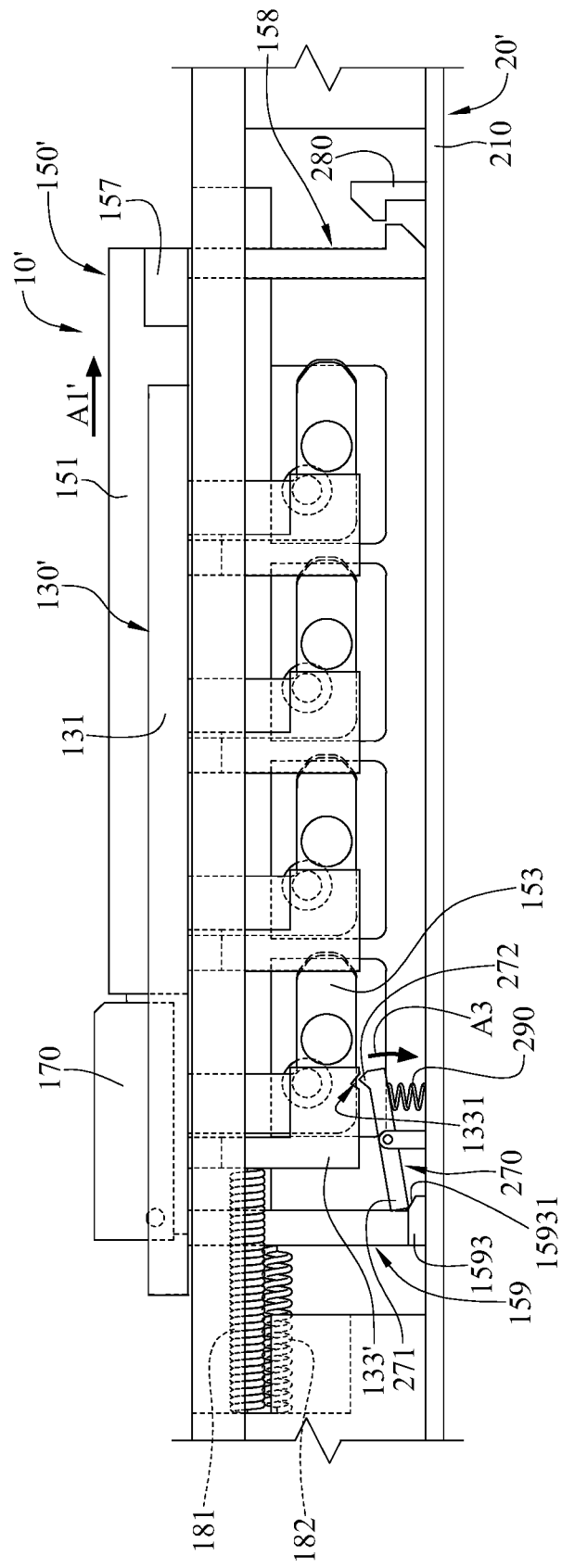
Figure 6D:
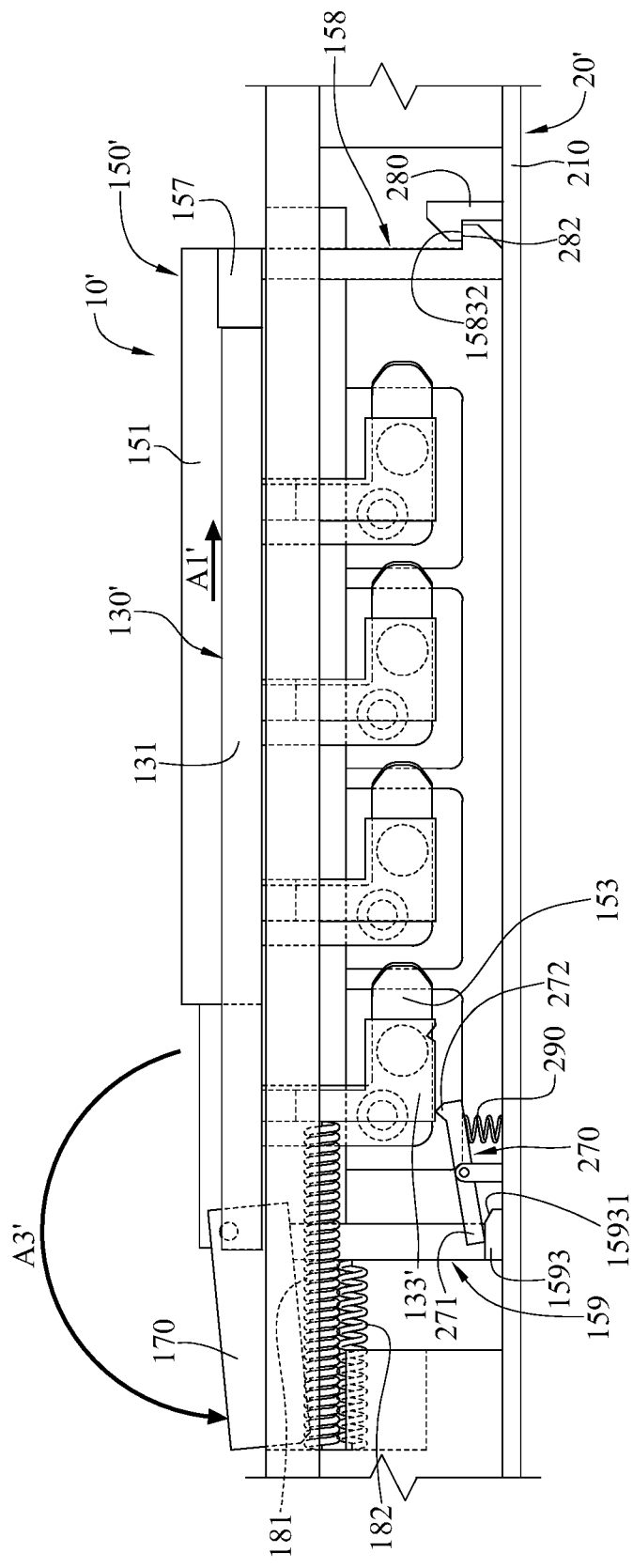

In addition, the latch 170 is pivotablly connected to one end of the second mount portion 151 of the second slidable component 150' and is movably located at the second groove 122 of the eaves portion 120 and therefore has an unfolded position (as shown in FIG. 6D) and a folded position (as shown in FIG. 6C). In the unfolded position, the latch 170 can be rotated about a pivot (not numbered) in a direction indicated by arrow A3' to be partially located in the second groove 122. At this position, the latch 170 extends towards a direction away from an end of the second mount portion 151, and the solid object formed by the latch 170 and the second mount portion 151 may be substantially as long as the second groove 122, thus, the end of the latch 170 away from the second mount portion 151 may press against an end of the second groove 122 so that the second slidable component 150' at this moment is restricted by the latch 170 and not allowed to be moved towards the second insertion portion 153. That is, the latch 170 is able to keep the second insertion portion 153 in the second holding position when it is in the folded position. And the latch 170 can be rotated in a direction opposite to arrow A3' to be moved to the folded position and arranged side by side with at least part of the second mount portion 151 in the second groove 122. In the folded position, the solid object formed by the latch 170 and the second mount portion 151 becomes shorter than second groove 122, thus, the second groove 122 now has unoccupied space available for the movement of the second slidable component 150' and the latch 170, such that the second insertion portions 153 at this moment are movably between the second released position and the second holding position.

The stopper 270 of the device body 20' is pivotablly disposed on or above the plate component 210 and therefore has a stopping position (as shown in FIG. 6B discussed in later paragraphs) and a releasing position (as shown in FIGS. 6C-6D discussed in later paragraphs). Specifically, the stopper 270 may include a push end 271, a stopping end 272, and a pivoting portion 273 located between and connected to the push end 271 and the stopping end 272, the stopper 270 is pivotablly disposed on or above the plate component 210 via the pivoting portion 273. The third restoring component 290 of the device body 20' is, for example, a compression spring, having one end fixed to the plate component 210 and another end pressed by or fixed to the stopping end 272. The third restoring component 290 can constantly apply force to the stopping end 272 so as to force the stopper 270 to move towards the stopping position. That is, the third restoring component 290 is clamped by the plate component 210 and the stopping end 272. On the other hand, a proper external force can be applied from the push end 271 or the stopping end 272 to force the stopper 270 to move towards the releasing position to cause the stopping end 272 to compress the third restoring component 290.

The hooking structure 280 of the device body 20' is fixed on or above the plate component 210 and is configured to be removably engaged with the hooking portion 1583 of the engaging part 158. In more detail, the hooking structure 280 may have a contact surface 281 and a second flat stopping surface 282, the contact surface 281 is inclined with respect to the plate component 210 and is substantially facing away from the plate component 210, and the second flat stopping surface 282 is located opposite to the contact surface 281 and is substantially facing towards the plate component 210.

Then, please refer to FIG. 5 and further refer to FIGS. 6A-6D, there are shown the installation processes of the battery assembly 10', considering the interactions between the first insertion portions 133', the second insertion portions 153, and the battery contacts 250 have been described in detail in the preceding paragraphs, thus the following will only simply mention the positions of the first insertion portions 133' and the second insertion portions 153 (e.g., the first released position, first holding position, second released position, and second holding position) to illustrate their relationship with the battery contacts 250. Also, the repeated contents will be omitted, and the battery contacts 250 and the protrusion 230 may be omitted from the drawings.

Firstly, as shown in FIG. 5, when or before the battery assembly 10' is placed onto the device body 20', the latch 170 can be switched to the folded position to make the first slidable component 130' and the second slidable component 150' slidable. Then, the battery assembly 10' can be placed onto the plate component 210 of the device body 20' (as indicated by arrow A2).

During this process, as shown in FIGS. 6A-6B, the contact surface 15831 of the hooking portion 1583 of the second slidable component 150' will contact the contact surface 281 of the hooking structure 280, and the contact surface 281 can force the second insertion portions 153 of the second slidable component 150' to move towards the second released position (as indicated by arrow A1) by pushing the contact surface 15831.

At the same time, the second slidable component 150' can push the first slidable component 130' by its push part 157 so as to move the first insertion portions 133' of the first slidable component 130' towards the first released position. Meanwhile, the first restoring component 181 and the second restoring component 182 can be respectively compressed by the first slidable component 130' and the second slidable component 150' to store more elastic potential energy. When the contact surface 15831 is not pushed by the contact surface 281, the elastic potential energy stored in the first restoring component 181 and the second restoring component 182 will be released and respectively used to restore the first slidable component 130' and the second slidable component 150' to their original position and therefore respectively push the first insertion portions 133' of the first slidable component 130' and the second insertion portions 153 of the second slidable component 150' to the first holding position and the second holding position.

The above steps may be completed by simply pushing the second slidable component 150'. In detail, when or before placing the battery assembly 10' on the device body 20', the second slidable component 150' can be pushed as indicated by arrow A1, and the first slidable component 130' will be moved in the direction indicated by arrow A1 with the second slidable component 150' by being pushed by the push part 157 of the second slidable component 150', thus simply pushing the second slidable component 150' can simultaneously move the first insertion portions 133' to the first released position and the second insertion portions 153 to the second released position.

When the first insertion portions 133' reach the first released position, the stopping end 272 of the stopper 270 of the device body 20' is engaged with the recess 1331 of the first insertion portion 133', and the stopping end 272 is firmly engaged with recess 1331 by being forced by the third restoring component 290. At this moment, the first insertion portion 133' is held by the stopping end 272 and therefore maintained in the first released position, such that the first slidable component 130' is maintained in the current position by the stopper 270.

Then, as shown in FIGS. 6C-6D, the second slidable component 150' can be released when the battery assembly 10' is placed in position, and which allows the elastic potential energy stored in the second restoring component 182 to be released and used to restore the second insertion portions 153 to the second holding position. During the movement of the second insertion portions 153 to the second holding position, the pushing surface 15931 of the push portion 1593 of the second slidable component 150' can push the push end 271 of the stopper 270 so as to force the stopping end 272 to leave the recess 1331 of the first insertion portion 133' and to compress the third restoring component 290 (as indicated by arrow A3). Then, the first insertion portion 133' does not hold by the stopper 270 so that the first insertion portions 133' will be moved towards the first holding position by the elastic potential energy released from the first restoring component 181. And then the restoring of the second slidable component 150' can make the first flat stopping surface 15832 of the engaging part 158 to engage the second flat stopping surface of the hooking structure 280.

Then, the latch 170 can be switched to the unfolded position (as indicated by arrow A3') to make the solid object formed by the latch 170 and the second mount portion 151 have a length substantially the same as that of the second groove 122, thereby maintaining the second slidable component 150' in the current position and preventing it from moving due to external force.

Through the foregoing steps, the first insertion portions 133' and the second insertion portions 153 can be maintained in positions that can hold and pressure the battery contacts 250 of the device body 20' so as to improve and secure the electrical contact between the battery contacts 250 and the battery terminals 113. In addition, the first restoring component 181 and the second restoring component 182 not only can automatically restore the first insertion portions 133' and the second insertion portions 153 to their original positions but also can constantly pressure the first insertion portions 133' and the second insertion portions 153 so as to keep them in the current positions, increasing the reliability of the electrical connection. Further, the latch 170 can be used to limit the movement of the second slidable component 150' so as to prevent the second insertion portion 153 from leaving the second holding position due to external force, thereby further increasing the reliability of the electrical connection.

According to the battery assembly and the electronic device having the same as discussed in the above embodiments, the battery assembly has the first insertion portion and the second insertion portion that can be inserted into the idle space formed by the battery contact to prevent the battery contact from being deformed due to external force and thus can prevent the battery contact from being separated from the battery terminal due to external force caused by the shaking of the electronic device or the electronic device falling on the ground, or due to elastic fatigue of the battery contact, thereby preventing poor contact or power off of the device and improving the reliability.

In addition, in some embodiments, the part of the second insertion portion not inserted into the idle space of the battery contact can have electrical contact with the contact bump of the battery terminal to increase the number of conductive path between the battery terminal and the battery contact. Thus, if the battery contact accidentally leaves the battery terminal, the electrical contact between the second insertion portion and the contact bump still can secure the electrical connection between the battery contact and the battery terminal. This improves the reliability of the electrical connection and prevents the device from being powered off.

In addition, in some embodiments, the first insertion portion has a higher stiffness than the second insertion portion, thus the insertion of the first insertion portion helps increase the overall stiffness of the first insertion portion, the second insertion portion, and the battery contact and make the battery contact less likely to be deformed by external force.

Further, in some embodiments, the battery assembly may include a first restoring component and a second restoring component that not only can help restore the first insertion portion and the second insertion portion but also can constantly pressure the first insertion portion and the second insertion portion so as to keep them in the current positions, increasing the reliability of the electrical connection.

Furthermore, in some embodiments, the battery assembly may include a latch that can be used to limit the movement of the second slidable component so as to prevent the second insertion portion from leaving the second holding position due to external force, thereby further increasing the reliability of the electrical connection.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An electronic device, comprising:
a device body, comprising a plate component, a protrusion, and at least one battery contact, wherein the protrusion is disposed on and protrudes from the plate component along a first direction, the at least one battery contact protrudes outwardly along a second direction from the protrusion, the second direction is perpendicular to the first direction, and the at least one battery contact and the protrusion form an idle space therebetween; and
a battery assembly, comprising a battery body, at least one battery terminal, and at least one first insertion portion, wherein the at least one battery terminal is disposed on the battery body, and the at least one first insertion portion is slidably disposed on the battery body;
wherein, the battery body is detachably installed on the plate component of the device body, the at least one battery terminal is configured to be electrically connected to the at least one battery contact, the at least one first insertion portion is configured to be removably inserted into the idle space along an insertion direction perpendicular to the first direction and the second direction so that at least part of the at least one battery contact is clamped by the at least one first insertion portion and the at least one battery terminal.

2. The electronic device according to claim 1, wherein a slidable direction of the at least one first insertion portion is substantially parallel to an arrangement direction of the at least one battery terminal.

3. The electronic device according to claim 1, wherein the battery assembly further comprises at least one second insertion portion, the at least one second insertion portion is slidably disposed on the battery body and removably inserted into the idle space, the at least one second insertion portion is located between the at least one first insertion portion and the at least one battery terminal, and a part of the at least one first insertion portion inserted into the idle space presses against the at least one second insertion portion.

4. The electronic device according to claim 3, wherein a slidable direction of the at least one second insertion portion is substantially parallel to an arrangement direction of the at least one battery terminal.

5. The electronic device according to claim 3, wherein the at least one first insertion portion has a higher stiffness than that of the at least one second insertion portion.

6. The electronic device according to claim 3, wherein the at least one second insertion portion is made of metal, the at least one battery terminal has a contact bump configured to be electrically connected to a part the at least one second insertion portion not inserted into the idle space.

7. The electronic device according to claim 3, wherein the at least one second insertion portion has a convex structure configured to contact the at least one first insertion portion in the idle space.

8. The electronic device according to claim 1, wherein the battery assembly further comprises a first restoring component clamped by the battery body and the at least one first insertion portion, the at least one first insertion portion has a first released position and a first holding position; in the first released position, the at least one first insertion portion leaves the idle space and compresses the first restoring component; in the first holding position, the at least one first insertion portion is inserted into the idle space; the first restoring component is configured to move the at least one first insertion portion towards the first holding position.

9. The electronic device according to claim 3, wherein the battery assembly further comprises a second restoring component clamped by the battery body and the at least one second insertion portion, the at least one second insertion portion has a second released position and a second holding position; in the second released position, the at least one second insertion portion leaves the idle space and compresses the second restoring component; in the second holding position, the at least one second insertion portion is inserted into the idle space; the second restoring component is configured to move the at least one second insertion portion towards the second holding position.

10. The electronic device according to claim 3, wherein the battery body has a first groove and a second groove, the battery assembly further comprises a first mount portion and a second mount portion, the first mount portion is slidably disposed in the first groove, the second mount portion is slidably disposed in the second groove, the at least one first insertion portion is connected to the first mount portion and is slidable along the first groove so as to have a first released position and a first holding position, the at least one second insertion portion is connected to the second mount portion and is slidable along the second groove so as to have a second released position and a second holding position; in the first released position, the at least one first insertion portion leaves the idle space; in the first holding position, the at least one first insertion portion is inserted in to the idle space; in the second released position, the at least one second insertion portion leaves the idle space; in the second holding position, the at least one second insertion portion is inserted into the idle space.

11. The electronic device according to claim 10, wherein the battery assembly further comprises a latch pivotally connected to one end of the second mount portion and is movably located at the second groove so as to have an unfolded position and a folded position; in the folded position, the latch is arranged side by side with at least part of the second mount portion in the second groove; in the unfolded position, the latch extends towards a direction away from the second mount portion, and one end of the latch away from the second mount portion presses against one end of the second groove so as to limit the at least one second insertion portion in the second holding position.

12. The electronic device according to claim 10, wherein the battery assembly further comprises a push part protruding from the second mount portion and located at one end of the first mount portion; when the at least one second insertion portion is moved towards the second released position, the push part pushes the first mount portion so as to move the at least one first insertion portion towards the first released position.

13. The electronic device according to claim 10, wherein the battery assembly further comprises an engaging part extending outwardly from the second mount portion and slidably disposed through the second groove, the engaging part has a first flat stopping surface facing away from the plate component, the device body further comprises a hooking structure, the hooking structure has a second flat stopping surface facing towards the plate component, the engaging part is configured to be removably engaged with the hooking structure when the at least one second insertion portion is in the second holding position, and the first flat stopping surface is configured to be engaged with the second flat stopping surface.

14. The electronic device according to claim 10, wherein the device body further comprises a stopper and a third restoring component, the stopper comprises a push end, a stopping end, and a pivoting portion; the pivoting portion is connected to and located between the push end and the stopping end and is pivotally disposed on the plate component, the third restoring component is clamped by the plate component and the stopping end, the stopping end is configured to be removably engaged with a recess of the at least one first insertion portion when the at least one first insertion portion is in the first released position so as to maintain the at least one first insertion portion in the first released position.

15. The electronic device according to claim 14, wherein the battery assembly further comprises a lifting part, the lifting part protruding from the second mount portion and slidably disposed through the second groove, the lifting part has a pushing surface, the pushing surface is configured to push the push end of the stopper when the at least one second insertion portion is moved from the second released position towards the second holding position so as to force the stopping end of the stopper to leave the recess of the at least one first insertion portion.

16. A battery assembly, detachably installed on a device body and electrically connected to at least one battery contact on a protrusion of the device body, the battery assembly comprising:
  a battery body, at least one battery terminal, and at least one first insertion portion, wherein the at least one battery terminal is disposed on the battery body, and the at least one first insertion portion is slidably disposed on the battery body;
  wherein, the protrusion protrudes from the device body along a first direction, the at least one battery contact protrudes outwardly along a second direction from the protrusion, and the at least one first insertion portion is removably inserted into an idle space formed between the at least one battery contact and the protrusion along an insertion direction perpendicular to the first direction and the second direction so that at least part of the at least one battery contact is clamped by the at least one first insertion portion and the at least one battery terminal.

17. The battery assembly according to claim 16, wherein a slidable direction of the at least one first insertion portion is substantially parallel to an arrangement direction of the at least one battery terminal.

18. The battery assembly according to claim 16, wherein the battery assembly further comprises at least one second insertion portion, the at least one second insertion portion is slidably disposed on the battery body and removably inserted into the idle space, the at least one second insertion portion is located between the at least one first insertion portion and the at least one battery terminal, and a part of the at least one first insertion portion inserted into the idle space presses against the at least one second insertion portion.

19. The battery assembly according to claim 18, wherein a slidable direction of the at least one second insertion portion is substantially parallel to an arrangement direction of the at least one battery terminal.

20. The battery assembly according to claim 18, wherein the at least one first insertion portion has a higher stiffness than that of the at least one second insertion portion.

21. The battery assembly according to claim 18, wherein the at least one second insertion portion is made of metal, the at least one battery terminal has a contact bump configured to be electrically connected to a part the at least one second insertion portion not inserted into the idle space.

22. The battery assembly according to claim 18, wherein the at least one second insertion portion has a convex structure configured to contact the at least one first insertion portion in the idle space.

23. The battery assembly according to claim 16, further comprising a first restoring component clamped by the battery body and the at least one first insertion portion, the at least one first insertion portion has a first released position and a first holding position; in the first released position, the at least one first insertion portion leaves the idle space and compresses the first restoring component; in the first holding position, the at least one first insertion portion is inserted into the idle space; the first restoring component is configured to move the at least one first insertion portion towards the first holding position.

24. The battery assembly according to claim 18, further comprising a second restoring component clamped by the battery body and the at least one second insertion portion, the at least one second insertion portion has a second released position and a second holding position; in the second released position, the at least one second insertion portion leaves the idle space and compresses the second restoring component; in the second holding position, the at least one second insertion portion is inserted into the idle space; the second restoring component is configured to move the at least one second insertion portion towards the second holding position.

25. The battery assembly according to claim 18, further comprising a first mount portion and a second mount portion, the battery body having a first groove and a second groove, wherein the first mount portion is slidably disposed in the first groove, the second mount portion is slidably disposed in the second groove, the at least one first insertion portion is connected to the first mount portion and is slidable along the first groove so as to have a first released position and a first holding position, the at least one second insertion portion is connected to the second mount portion and is slidable along the second groove so as to have a second released position and a second holding position; in the first released position, the at least one first insertion portion leaves the idle space; in the first holding position, the at least one first insertion portion is inserted in to the idle space; in the second released position, the at least one second insertion portion leaves the idle space; in the second holding position, the at least one second insertion portion is inserted into the idle space.

26. The battery assembly according to claim 25, further comprising a latch, wherein the latch is pivotally connected to one end of the second mount portion and is movably located at the second groove so as to have an unfolded position and a folded position; in the folded position, the latch is arranged side by side with at least part of the second mount portion in the second groove; in the unfolded position, the latch extends towards a direction away from the second mount portion, and one end of the latch away from the second mount portion presses against one end of the second groove so as to limit the at least one second insertion portion in the second holding position.

27. The battery assembly according to claim 25, further comprising a push part protruding from the second mount portion and located at one end of the first mount portion; when the at least one second insertion portion is moved towards the second released position, the push part pushes the first mount portion so as to move the at least one first insertion portion towards the first released position.

\* \* \* \* \*